M. T. GREENWOOD, dec'd.
MARY A. GREENWOOD, Admr'x.
Centering Device.
No. 167,834. Patented Sept. 21, 1875.
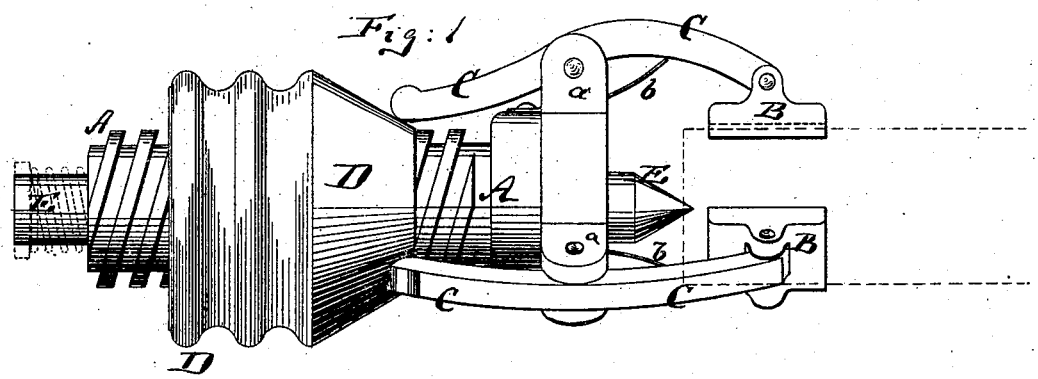
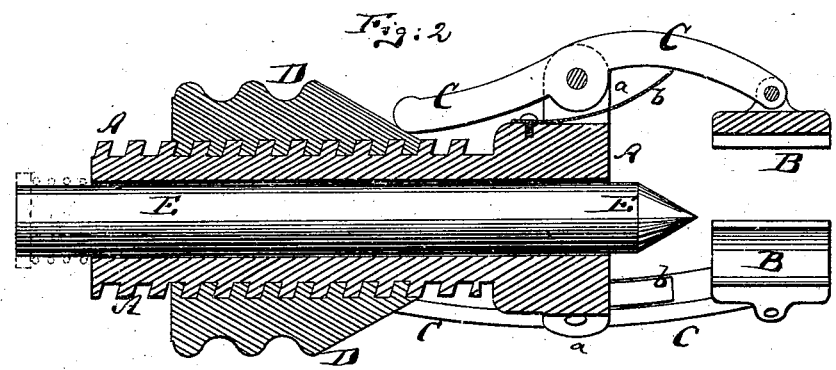

UNITED STATES PATENT OFFICE.

MARY A. GREENWOOD, OF FITCHBURG, MASSACHUSETTS, ADMINISTRATRIX OF MARK T. GREENWOOD, DECEASED.

IMPROVEMENT IN CENTERING DEVICES.

Specification forming part of Letters Patent No. 167,834, dated September 21, 1875; application filed March 12, 1875.

*To all whom it may concern:*

Be it known that MARK TRUE GREENWOOD, deceased, late of Fitchburg, in the county of Worcester and State of Massachusetts, did invent an Improved Centering-Machine, of which the following is a specification:

Figure 1 is a side view of the improved centering device. Fig. 2 is a longitudinal central section of the same.

Similar letters of reference indicate corresponding parts in both figures.

The object of this invention is to produce an implement for rapidly and exactly centering the work to be put into a lathe or other machine; and the invention consists principally in the combination of an ordinary chuck or vise, having jaws hung on central pivots in the ends of the primary jaws or levers, for holding the work to be centered, with a sliding punch, which is guided in the tubular shank of said chuck or vise.

In the accompany drawing, the letter A represents the tubular shank of a chuck. B B are the jaws of said chuck, pivoted to levers C C, that are supported on projecting arms $a$ $a$ of the front end of the shank A. Springs $b$ $b$ bear against the inner faces of the levers, and tend to hold the jaws B B apart. D is a conical nut, fitted upon the threaded shank A, for the purpose of closing the jaws against the work introduced between them. E is a sliding rod, of a diameter to cause it to fit the tubular bore of the shank A, so it may slide back and forward therein. The front end of said rod E is pointed, or nearly so, as indicated in the drawing.

The work to be centered, being a shaft or other suitable article, is inserted between the jaws, the nut D screwed up to close the jaws tight against the work, and the punch or rod E then driven through the shank against the end of the work, to mark or puncture the same with its point, at the place at which the same is to be marked or centered. Thus, the centering operation will be, so to say, automatic, as a common laborer, who can merely operate the nut D and the punch E, will be able to center work with great accuracy and great speed.

The jaws B may be of suitable form, having either concave faces, as shown, to fit cylindrical work, or straight or hollow prismatic faces, or such of other suitable form, according to the style of work to be centered.

The machine may be operated either by holding the shank A stationary to a suitable bench or support, and driving the punch by a hammer or a suitable lever after the jaws have been contracted; or, for use on light work, the punch may be held stationary, and the chuck, with the work held in its jaws, moved down on the same.

It will be of advantage to use a double, treble, or other style of screw-thread on the shank, which will enable the nut to move up and down with great rapidity, so the jaws will be closed by a short turn of the nut. The same apparatus may also be used for marking out of center—for instance, for work used to produce ovals, spokes, and the like, in which case the jaws of the chuck or vise are applied with respect to the axis of the punch E, so as to cause the punch to strike the work at that distance from its outer sides at which it is desired to apply the tool whereon said work is subsequently to be revolved or held.

I claim, as the invention of the said MARK TRUE GREENWOOD—

The centering device herein described, consisting of the punch E, tubular threaded shank A, conical nut D, levers C, and pivoted jaws B, combined and operated as and for the purposes set forth.

The above description of the invention of MARK TRUE GREENWOOD, deceased, signed by me, his administratrix, this 9th day of March, 1875.

MARY A. GREENWOOD,
       *Administratrix.*

Witnesses:
 J. M. WOODBURY,
 HORACE R. RICE.